United States Patent [19]

Fischer et al.

[11] 3,723,610

[45] Mar. 27, 1973

[54] PROCESS FOR MAKING CARBON ARTICLES

[75] Inventors: Walter Fischer; Joseph Heckmaier, both of Burghausen-Upper Bavaria, Germany

[73] Assignee: Wacker-Chemie G.m.b.H., Munich, Germany

[22] Filed: Feb. 19, 1971

[21] Appl. No.: 117,047

Related U.S. Application Data

[63] Continuation of Ser. No. 747,443, July 25, 1968, abandoned.

[30] Foreign Application Priority Data

July 26, 1967 Germany ......................... W 44 447

[52] U.S. Cl. ................. 423/447, 264/29, 423/445, 423/449
[51] Int. Cl. ...................... C01b 31/02, C01b 31/07
[58] Field of Search .............. 23/209.1, 209.2, 209.4; 264/29; 8/115.5; 423/445, 447, 449

[56] References Cited

UNITED STATES PATENTS

| | | | |
|---|---|---|---|
| 3,529,934 | 9/1970 | Shindo | 23/209.1 |
| 3,488,151 | 1/1970 | Noss | 23/209.1 |
| 3,427,120 | 2/1969 | Shindo et al. | 23/209.1 X |
| 3,305,315 | 2/1967 | Bacon et al. | 23/209.1 |
| 3,449,077 | 6/1969 | Stuetz | 23/209.1 |

OTHER PUBLICATIONS

Kaswell "Wellington Sears Handbook of Industrial Textiles" 1963, page 58.

*Primary Examiner*—Edward J. Meros
*Attorney*—Donald Malcolm

[57] ABSTRACT

Process for making carbon filaments, foils, threads, fibers, fabrics and similar formed bodies which comprises treating such a body composed of a copolymerizate of vinyl chloride and at least one substance selected from the group consisting of polyvinyl alcohol and derivatives of polyvinyl alcohol with an acid condensation agent, such as concentrated sulfuric acid, until it becomes unmeltable at pyrolysis temperatures and then subjecting the treated body to pyrolysis. A formed body of a copolymerizate of vinyl chloride and vinyl acetate which contains 40 to 95 percent of vinyl chloride is particularly suitable in the process.

4 Claims, No Drawings

PROCESS FOR MAKING CARBON ARTICLES

This application is a continuation application of application Ser. No. 747,433 filed July 25, 1968, now abandoned.

BACKGROUND OF THE INVENTION

There are known methods of converting cellulose, e.g. in the form of filaments, foils, wires, threads, yarns, fleece, fabrics and woven goods by heating while excluding oxygen, into suitably shaped objects of substantially pure carbon. Carbon fibers and molded objects consisting of carbon fibers are used in all fields where there are extreme requirements of temperature stability and chemical inertness.

The conversion of a thermoplastic synthetic fiber material by pyrolysis into carbon fibers must occur without any substantial change of shape, which requires the material to be transformed into carbon under the influence of elevated temperatures without melting, while separating components which should preferably be only gaseous.

SUMMARY OF THE INVENTION

We have now discovered a process for making carbon filaments, etc. which is characterized by the fact that formed bodies like filaments, foils, threads, fibers, and articles made from them, e.g. fleece materials, yarns, fabrics and woven goods, of copolymerizates of vinyl chloride and at least one material selected from the group consisting of polyvinyl alcohol and derivatives of polyvinyl alcohol, are cross-linked by treatment with acid condensation agents until they become unmeltable at pyrolysis temperatures, and then they are subjected to pyrolysis.

DESCRIPTION OF THE PREFERRED EMBODIMENTS

Suitable condensation agents for carrying out the invention are concentrated sulphuric acid, or other acids like difluorophosphoric acid, hexafluorophosphoric acid, which have a similar effect.

After condensation one already obtains a glossy deep black substance with surprisingly good mechanical properties which has no melting point and it can therefore be subjected to pyrolysis without danger of losing its shape.

As the copolymerizate component one can use, for instance: vinyl acetate, vinyl propionate, vinyl pivalate, vinyl laurate, vinyl stearate, vinylversatic ester, generally straight-chained and/or branched vinyl esters of carboxylic acids with up to 18 carbon atoms, where the vinyl ester portion amounts to 5 – 60 weight percent.

Particularly suitable are shaped bodies of the copolymerizate vinyl chloride/vinyl acetate with a proportion of vinyl acetate of 5 – 60 weight percent.

The condensation during the splitting off the acid depends heavily on the temperature and preferably it is carried out between 0° C and the softening temperature of the shaped bodies, preferably 10° – 20° C below their softening temperature.

The pyrolysis of the condensed substance can be carried out in accordance with known methods while excluding oxygen. The separation of gaseous products, mainly hydrochloric acid, starts at 150° – 200° C and is practically completed at 350° – 400° C. The yield of liquid pyrolysis products which cause the undesirable caking of the oven is extremely small.

On further heating to about 1000° C one obtains a product with a content of about 96 percent carbon and very good stability which can be transformed at 2000° – 3000° C into graphite with a carbon content of over 99 percent.

Compared with the known pyrolysis of cellulose articles, the process of our invention has the following advantages:

The copolymerizates under consideration are cheap and they can be formed thermoplastically, so that one can make, for example, for insulation and filtering purposes, without any difficulties, carbon fiber-fleece articles of desired stiffness and shape, e.g. hoods, mantles, candles, etc.

Carbon fibers made in accordance with the present invention have a tenacity of 3–5 g/den, while commercial carbon fiber materials usually have a tenacity of 1 g/den.

EXAMPLE 1

One weight part of copolymerizate composed of 85 weight percent vinyl chloride and 15 weight percent vinyl acetate are immersed for 9 days in 10 weight parts of concentrated sulphuric acid ($d = 1.84$) at 20° C, and subsequently it is centrifuged, washed and dried.

After this treatment the previously colorless fibers are shiny deep black and unmeltable.

The material which has been thus pre-treated is heated, with the exclusion of air, for 4 hours to 400° C, and subsequently for 1 hour to 1000° C.

|  | Titre den | Tenacity g/den | Extension % |
|---|---|---|---|
| Starting substance | 6.27 | 0.49 | 214 |
| After treatment with sulphuric acid | 5.80 | 1.06 | 30.1 |
| Carbon fiber | 2.92 | 4.89 | 2.9 |

EXAMPLE 2

One weight part of fibers of a copolymerizate composed of 90 weight percent vinyl chloride, 5 weight percent vinyl acetate and 5 weight percent vinyl alcohol are immersed for 24 hours in 15 weight parts concentrated sulphuric acid ($d = 1.84$) at 50° C, and subsequently it is centrifuged, washed and dried.

The pyrolysis is carried out as in Example 1, but the apparatus is rinsed with after-purified nitrogen. We obtain a carbon fiber with a tenacity of 3.21 g/den.

EXAMPLE 3

One weight part of a thermally stabilized material of fleece, of fibers of a copolymerizate composed of 60 weight percent vinyl chloride and 40 weight percent vinyl acetate is immersed for 28 days in 10 weight parts of difluorophosphoric acid at 20° C. Further treatment is the same as in Example 1.

We obtain a fleece material of carbon fibers. The breaking length is 297 m.

EXAMPLE 4

One weight part of a fleece material that has been stabilized by formation of needles mechanically from fibers of a copolymerizate composed of 60 weight percent vinyl chloride and 40 weight 5 vinyl pivalate is soaked with concentrated sulphuric acid. Subsequently the sulphuric acid is removed by squeezing out except for a residual content of 2 weight parts and the fleece material is heated for 24 hours to 50° C. After washing and dying the material treated in this manner, the pyrolysis is performed as in Example 1.

The fleece material of carbon fibers obtained in this manner has a breaking length of 345 m.

EXAMPLE 5

A yarn of 1200 single threads, total titer 6450 den, made of a copolymerizate of the composition 85 parts by weight vinyl chloride and 15 parts by weight of vinyl acetate is continuously inserted, at a speed of 1.6 m per minute, in loose loops, into one side of a U-shaped container which is filled with concentrated sulphuric acid ($d = 1.84$). 24 hours after the beginning of such insertion the now interlaced black yarn, which has a chlorine content of 29.1 percent by weight, is continuously drawn out of the other side. The adherent sulphuric acid is removed by means of suction down to 1.5 to 2.0 weight parts compared with the original weight of the yarn, and the yarn is led through an oven with a heating zone of 400° C at the entrance side and 1000° C at the exit side which is rinsed with a counterflow of nitrogen. At the yarn entrance side a condensate is drawn off which consists essentially of about 20 percent hydrochloric acid, 3 – 5 percent sulphuric acid, and the rest water. The waste gas at the yarn entrance side contains major quantities of hydrochloric acid, sulphur dioxide and water vapor.

The yarn leaving the zone with a temperature of 1000° C, cooled by nitrogen, is spooled at a speed of 1 m per minute, and has the following characteristics:

| | |
|---|---|
| Carbon content | 95.4% |
| Total titer | 3,730 den |
| Breaking load | 953 g |

We claim:

1. Process for making a shaped carbon body, which comprises treating a shaped body composed of a copolymerizate of vinyl chloride with at least one substance selected from the group consisting of polyvinyl alcohol and esters of polyvinyl alcohol with carboxylic acids having up to 18 carbon atoms with concentrated sulphuric acid until the treated body becomes unmeltable at pyrolysis temperatures and then subjecting the treated body to pyrolysis.

2. Process according to claim 1, in which said body consists of copolymerizate of vinyl chloride and vinyl acetate which contain 40 to 95 percent of vinyl chloride.

3. Process according to claim 1, in which the treatment temperature is between 0° C and the softening temperature of said body.

4. Process according to claim 1, in which the treatment temperature is 10° – 20° C below the softening temperature of the body.

* * * * *